Sept. 8, 1970     T. H. GUILFORD     3,527,276
CAULIFLOWER LEAF TRIMMING MACHINE
Filed Nov. 22, 1966
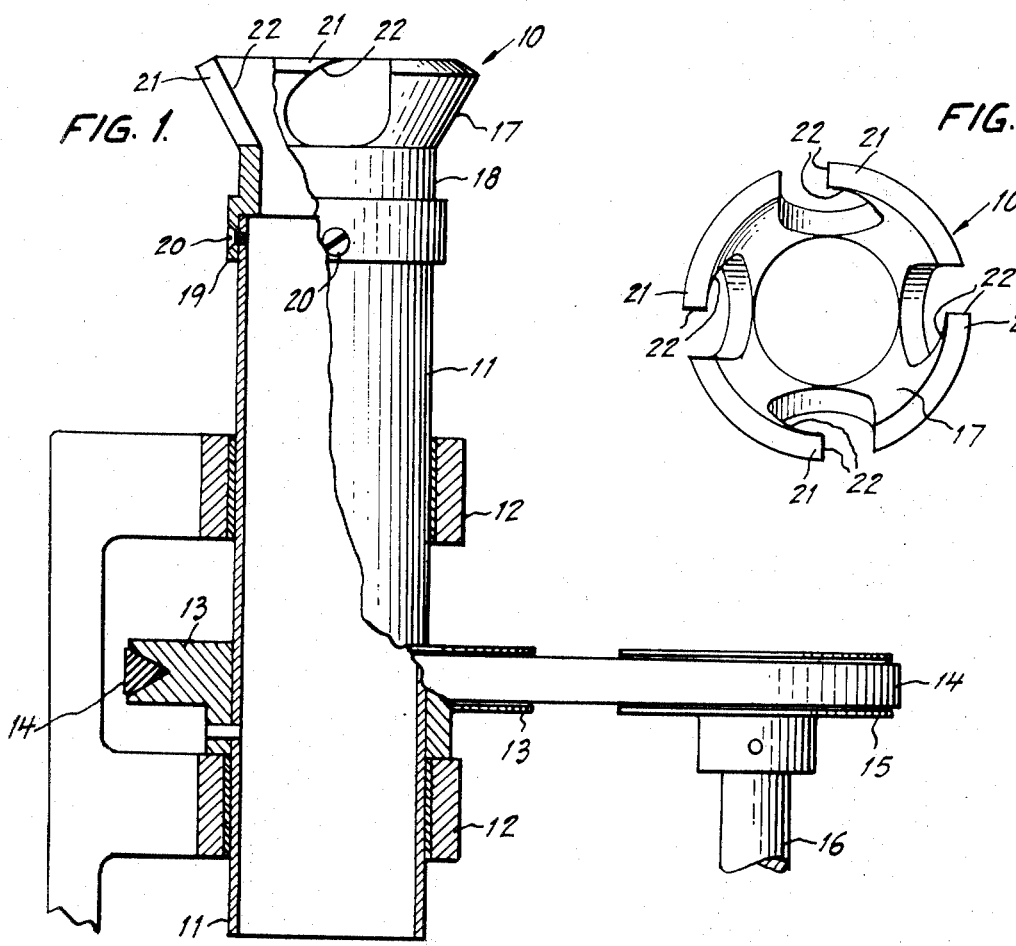
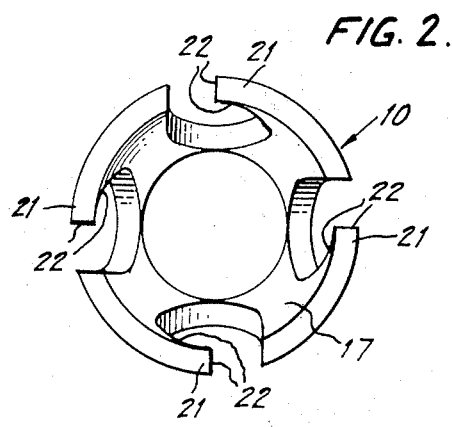
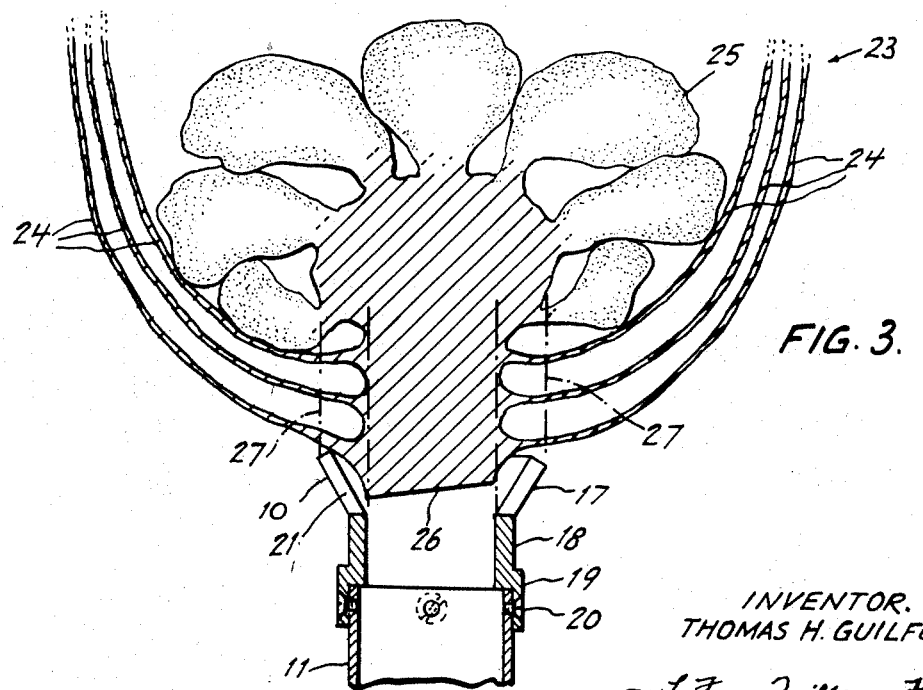
INVENTOR.
THOMAS H. GUILFORD.
By LeFever, Quillinan + Hubbard
ATTORNEYS.

3,527,276
CAULIFLOWER LEAF TRIMMING MACHINE
Thomas Harlan Guilford, Le Roy, N.Y., assignor to General Foods Corporation, White Plains, N.Y., a corporation of Delaware
Filed Nov. 22, 1966, Ser. No. 596,191
Int. Cl. A01d 55/00; B02c 13/00; A01f 1/06
U.S. Cl. 146—106                                2 Claims

ABSTRACT OF THE DISCLOSURE

A cauliflower leaf trimming machine including cauliflower stem guiding means, cutting means which is co-axial with the guiding means, and rotary movement producing means whereby the leaves appended to the stem are cut away.

---

This invention relates to a machine for removing leaves from cauliflower. More particularly, this invention is concerned with a trimming machine which is especially adapted to remove the leaves from the stem of a cauliflower with a minimum amount of manual labor, in a very short time, and in a manner whereby the cauliflower flowerets can thereafter be recovered without substantial injury or damage. Still more particularly, this invention is directed to a process for removing the leaves from cauliflower employing said trimming machine.

Cauliflower (*Brassica oleracea* var. *botrytis* L., Cruciferae) is one of the many vegetables which are obtained from the flower portion of the plant. Like broccoli, cauliflower is a type of cabbage in which the head consists of a mass of compacted, abortive underdeveloped flowers upon modified stems and the white or purplish flower mass is surrounded by green leaves. Califlower is cooked as a table vegetable and is frequently employed as an ingredient in mixed pickles. With the advent of modern food freezing processes, considerable quantities of cauliflower are marketed and sold frozen. Large scale processing of foods whether they are marketed frozen, canned, or fresh requires economy in operation. However, because of its botanical structure, cauliflower has long presented problems to the food processor, and the need has thus existed for a machine or device which would permit removal of the leaves from cauliflower with a minimum amount of manual labor. Yet, to the present, such apparatus has been either unavailable or considered inadequate to handle the tonnage quantities of cauliflower which would normally be processed in a large food plant during a rather short cauliflower harvesting season.

It is an object of the present invention to provide a machine whereby the leaves of cauliflower may be quickly separated, cut away and removed from the stem and the remaining stem portion containing the flowerets may then be processed further by conventional means.

Another object of the present invention is to provide a machine which is capable, with only minor or slight adjustments, of processing cauliflower without having to resort to extensive manual cutting or trimming operations.

A still further object of this invention is to provide a cauliflower leaf trimming machine that will permit later recovery of the flowerets without substantial damage thereto.

A still further object is to provide a machine and process to carry out the foregoing as well as other objects of the invention.

The machine or apparatus for trimming the leaves from cauliflower is more fully described in the ensuing description and claims and is shown by way of illustration in the accompanying drawing in which:

FIG. 1 is a longitudinal section of a machine constructed in accordance with the invention.

FIG. 2 is an end view of FIG. 1.

FIG. 3 is a diagrammatic view showing the trimming of leaves from a fully developed cauliflower with the machine.

With continued reference to the drawing and particularly to FIG. 1, the machine can be seen to comprise a router-like member 10 connected to a tube 11, usually fabricated from stainless steel and open to permit easy cleaning. The tube, which serves as guiding means for the stem of the cauliflower, is supported by bearings 12 and is adapted for rotary movement by means of V-pulley 13 mounted on the outside of the tube. Belt 14 is positioned on the pulley and also on pulley 15 which is mounted on the shaft 16 of a variable speed motor, not shown, that is used for power to rotate the tube.

The router 10 further consists of a substantially heavy body having a flaring portion 17 provided with a mouth tapered about its edge. Extending from the flaring portion is a tubular extension 18 and an enlarged extension 19, which latter extension is adapted to be secured to tube 11 by means of screws 20.

The router is provided with one or more cutters 21 in the flaring portion 17. The cutter, with cutting edge 22, is generally semi-circular in plan view, as may be seen from FIG. 2.

If desired, provision may be made for the cutter or cutters to be removable and, if so, the cuttter is mounted upon the flaring portion by means of a screw or other fastening device which would engage an aperture in the cutter and receptacle in the flaring portion. The aperture in the cutter may be elongated to permit adjustment of the cutting depth and also to allow for adjustment of the angle of the conical surface generated by the cutter as the router is rotated.

Referring to FIG. 3, a cauliflower 23 with its leaves 24 tied to protect the flowerets 25 is shown as it is received from the grower in the field. The core 26 is inserted by the machine operator into the mouth of the router 10 and is permitted to extend into tube 11 which serves as a guide during the trimming of the leaves. The router is then rotated, and during this operation the leaves are severed from the core or stem along the lines generally indicated at 27. The operation is terminated just before the flowerets attached to the core or stem are reached and this will generally be determined by the skill of the machine operator. The core or stem from which the leaves have been removed and to which the flowerets are still attached is then processed further as, for example, by hand trimming to remove the flowerets. Alternatively, the core or stem may be trimmed and the flowerets recovered by employing the machine and process described and claimed in my copending application Ser. No. 596,192, filed concurrently herewith.

It will be readiy apparent to those skilled in the art that many changes in construction, materials and the like of the machine, as well as widely differing embodiments and applications of the present invention are suggested without a departure from the spirit and scope of the invention. For example, suitable safety features may be incorporated without affecting the essential features of the machine. Accordingly, the present invention is not to be restricted in any way by the foregoing description which is merely illustrative but instead is to be construed broadly and is to be limited only by the following appended claims.

What is claimed is:

1. In a trimming device for cauliflower: an inverted frusto-conical member having a tubular extension, the frusto-conical portion thereof having at least one generally semi-circular cutter mounted thereon, said frusto-conical member being positioned by means of said tubular extension to a hollow cylindrical tube, said tube being adapted for rotation so that said cutter, upon rotation of said member and said tube, trims the leaves from the stem of a cauliflower.

2. In a trimming device as in claim 1, in which said frusto-conical member has a plurality of removable, generally semi-circular cutters, mounted in the frusto-conical portion thereof.

References Cited

UNITED STATES PATENTS

| 757,229 | 4/1904 | Roumiguiere | 146—106 |
| 1,395,481 | 11/1921 | Cline | 146—106 |
| 3,212,506 | 10/1965 | Hagopian | 130—30 |
| 3,259,135 | 7/1966 | Heatherington et al. | 130—30 |

W. GRAYDON ABERCROMBIE, Primary Examiner

U.S. Cl. X.R.

130—30; 146—52